(12) United States Patent
Kiss (10) Patent No.: US 11,908,074 B2
(45) Date of Patent: Feb. 20, 2024

(54) METHOD OF IDENTIFYING AND DISPLAYING AREAS OF LODGED CROPS

(71) Applicant: Viliam Kiss, Bratislava (SK)

(72) Inventor: Viliam Kiss, Bratislava (SK)

( * ) Notice: Subject to any disclaimer, the term of this patent is extended or adjusted under 35 U.S.C. 154(b) by 528 days.

(21) Appl. No.: 17/273,015

(22) PCT Filed: Sep. 3, 2019

(86) PCT No.: PCT/IB2019/057412
§ 371 (c)(1),
(2) Date: Mar. 3, 2021

(87) PCT Pub. No.: WO2020/049456
PCT Pub. Date: Mar. 12, 2020

(65) Prior Publication Data
US 2021/0327132 A1 Oct. 21, 2021

(30) Foreign Application Priority Data

Sep. 4, 2018 (SK) .................................. 143-2018 U
Sep. 4, 2018 (SK) .................................. 144-2018 U (51) Int. Cl.
*G06T 17/05* (2011.01)
*G06T 7/521* (2017.01)
(Continued)

(52) U.S. Cl.
CPC ............ *G06T 17/05* (2013.01); *G01C 11/025* (2013.01); *G01S 17/894* (2020.01); *G06Q 50/02* (2013.01);
(Continued)

(58) Field of Classification Search
CPC ...................... G06T 17/05; G06T 7/521; G06T 2207/10028; G06T 2207/10032;
(Continued)

(56) References Cited

U.S. PATENT DOCUMENTS

| 8,474,306 B1* | 7/2013 | Behroozi | G01N 13/02 |
| | | | 73/64.52 |
| 2013/0223189 A1* | 8/2013 | Davis, III | G01C 15/00 |
| | | | 367/99 |

(Continued)

FOREIGN PATENT DOCUMENTS

| CN | 105869152 | 8/2016 |
| CN | 106595603 | 4/2017 |

(Continued)

*Primary Examiner* — Jitesh Patel
(74) *Attorney, Agent, or Firm* — Defillo & Associates, Inc.; Evelyn A. Defillo (57) ABSTRACT

A three-dimensional surface of the upper cover of the crops is recognized and recorded by a contactless scanning from above the field; a referential height h of the crop's stem is determined and the three-dimensional surface of the field from which the crops grow is determined. A reached height x of the vegetation for the individual points is computed by comparison of the three-dimensional surface of the upper cover of the crops with the three-dimensional surface of the field, whereby in case the reached height x of the vegetation is smaller than the referential height h of the crop's stem this difference between the reached height x of the vegetation and the referential height h of the stem determines in a given point of the field the angle β of lodging pursuant to the goniometric function. A classification of the grains into classes depending on the angle α of the slope of the lodged grain in interval 0° to 90° is realized, whereby this results in computation of the heights (h) of the grain spikes pursuant to relation $x_{(0\ to\ n)} = h \cdot \sin \alpha_{(0\ to\ n)}$ for the creation of the digital vector map with the customizable levels of the lodging of the grains.

14 Claims, 6 Drawing Sheets

| Level of lodging | Lodging from vertical position in degrees |
|---|---|
| 9 | 5 |
| 8 | 15 |
| 7 | 25 |
| 6 | 35 |
| 5 | 45 |
| 4 | 55 |
| 3 | 65 |
| 2 | 75 |
| 1 | 85 |

(51) Int. Cl.
  *G01S 17/894* (2020.01)
  *G06Q 50/02* (2012.01)
  *G01C 11/02* (2006.01)
  *G06V 20/10* (2022.01)

(52) U.S. Cl.
  CPC ............ *G06T 7/521* (2017.01); *G06V 20/188* (2022.01); *G06T 2207/10028* (2013.01); *G06T 2207/10032* (2013.01); *G06T 2207/30188* (2013.01)

(58) Field of Classification Search
  CPC ......... G06T 2207/30188; G01C 11/025; G01S 17/894; G06Q 50/02; G06Q 50/00; G06V 20/188
  See application file for complete search history.

(56) References Cited

U.S. PATENT DOCUMENTS

| | | | |
|---|---|---|---|
| 2014/0035752 A1 | 2/2014 | Johnson | |
| 2014/0163781 A1* | 6/2014 | Vian | G01S 7/4802 701/3 |
| 2017/0016870 A1* | 1/2017 | McPeek | G01S 17/89 |
| 2017/0082442 A1* | 3/2017 | Anderson | G01C 21/20 |
| 2017/0334560 A1* | 11/2017 | O'Connor | B64C 39/024 |
| 2019/0220964 A1* | 7/2019 | Mello | G06T 7/001 |
| 2019/0274257 A1* | 9/2019 | Papanikolopoulos | G06T 7/62 |

FOREIGN PATENT DOCUMENTS

| | | |
|---|---|---|
| CN | 106643529 | 5/2017 |
| DE | 102011120858 | 6/2013 |

* cited by examiner

METHOD OF IDENTIFYING AND DISPLAYING AREAS OF LODGED CROPS

CROSS REFERENCE TO RELATED APPLICATION

This application is a national stage entry of PCT/IB2019/057412 filed Sep. 3, 2019, under the International Convention and claiming priority over Slovakia Patent Application No. PUV 143-2018 filed Sep. 4, 2018 and Slovakia Patent Application No. PUV 144-2018 filed Sep. 4, 2018.

FIELD OF TECHNOLOGY

The invention concerns an identification and display of the areas of field where lodged (flattened) crops are, mainly grain (corn, cereal, wheat). The invention discloses a production of the vector map/digital model of the lodged cornfield areas for the customizable (custom, adjustable) levels of lodging. This method concerns the classification and determination of the calamity areas by means of the air photography (air scanning), whereby photogrammetric methods and geodetic measurements are used. The invention in general falls within the fields of geodesy (geodetics) and agriculture.

STATE OF THE ART

Even today the assessment of calamities from the cornfields lodging uses manual methods of computing of the lodged spikes (ears, spikelets) directly on the ground. These methods are laborious and time-consuming. Most of the times a sample computing of local areas is conducted and these are then statistically extrapolated to the whole, which leads to significant mistakes in assessment of the state of the lodged cornfield areas.

The abovementioned deficiencies inspired a design of other system for the classification and determination of the surfaces of calamity areas from the lodging of cornfields in such a way that the requirements for labor and time are significantly lowered. It has also been a goal to introduce a classification with a customizable parameter. The result of this effort is a method of digital vector map/digital model of the lodged cornfield areas for the customizable levels of lodging disclosed in this invention.

Publication US2014035752 discloses a method of assessment of the actual state of the agricultural crops which combines and analyzes various sorts of data from various sources; it uses airplanes, satellites, or other flying devices. This publication does not disclose a method to identify lodged fields areas and the disclosed method is not usable ex post, that is, after a calamity event.

The method according to file US2017082442 describes an identification of the lodged crops by means of air photography, where a crop is identified which has a stem (stalk) in horizontal or mostly horizontal position instead of vertical position. The system uses the lodging sensors and the exact function of the sensor is not disclosed in the file in greater detail.

Pursuant to publication DE102011120858 a state and needs of crops can be determined contactlessly by means of a stereo camera and pursuant to this information the irrigation or fertilization is conducted. Publications CN105869152, CN106643529 allow for measurement of the height of the crops which produces a digital surface model (DSM) and compares it with basic surface model (BSM). Pursuant to these publications it is not clear how is the lodging and level of the lodging of the crops to be determined. Publication CN106595603 uses an altered response of the surface of the crops to the air flow produced by the drone for detection of the lodged crops, which is slow and ineffective interpretational method.

A method is desired and not known which will allow for quick and effective identification of the lodged crop areas, whereby the method should limit or completely exclude the subjective factors and it should allow intuitive display for easy interpretation of the identified state of the field.

SUMMARY OF THE INVENTION

The abovementioned differences are significantly remedied by a method of identification and display of lodged crops areas where a contactless sensing (scanning) from above the field a three-dimensional surface of the upper cover of the crops is recognized and recorded, a reference height h of a crops' stem (stalk) is determined, a three-dimensional surface of the field from which the crops grow is determined, according to this invention which essence lies in the fact that the on the basis of comparison of the three-dimensional surface of the upper cover of the crops with the three dimensional surface of the field an reached height x of the vegetation (stand, overgrowth) is computed for the individual points of the field, the height x being a height to which the crop reaches, whereby in case the reached height x of the vegetation is smaller than the referential height h of the crop's stem, then this difference between the reached height x of the vegetation and the referential height h of the stem defines an angle (slope) of lodging β in a given point of the field. The angle of lodging β is computed using the goniometric function. Such approach allows for very quick and effective processing of the results. The irregularities caused by neglecting some factors, such as the folding of the top of the step in cases of, for example, grain spikes, or irregularities when setting the referential height h of the stem, have negligible effect on the interpretational features of this method. The angle of lodging β is in the cases of damage of the crops so large (often ranging from 25° to) 85° that the absolute irregularities of the measurements are not transferred to the final interpretation. One can also neglect the fact, when proceeding pursuant to this method, that the measured height of the vegetation in a given point of the affected area conforms to the plant which grows in a different groundplan point, which is in the projection to the plane of the field moved from the peak of the crop.

The method of assessment, identification and depiction of the lodged crop fields areas according to this invention is quick and allows for reliable determination of the lodged areas. The term "stem" in this file denotes an axis of the plant, usually non-woody axis of the plant or a stalk or peduncle, for example an ear, a spike, stalk of grain, grass, and so on.

A significant feature of the proposed invention is the determination of the height to which the vegetation reaches in a given point, that is it basically determines the distance of the upper cover of the crops from the ground. Subsequently this dimension is compared with the referential height of the stem of the non-lodged crop. Such referential height of the stem is basically a biological length of the stem in the direction of its growth and it can be measured in various ways. It can be measured manually when at least 5, preferably at least 15 stems are plucked or picked. An average height is determined on the basis of these measurements and this is the referential height in further proceedings.

In another version of the method the average height can be measured on the edge of the field by the contactless measuring from above. This means that during the production of the three-dimensional image of the field a height step form by the beginning of the vegetation is determined and from the height if this step a referential height h is set. During the assessment various statistical methods of the assessment of the data can be used, where the referential height will determine only the areas with the maximal height of the vegetation so that the edge lodged areas are excluded. During an analysis one can use data about the edges of the fields pursuant to cadastral maps, too. The setting of the referential height h of the stem can be also done in such a way that in the view from above not only the upper cover of the vegetation is seen, but also the ground surface between the vegetation. This requires such data rasterization so that data include the distances from the surface of the stem's top and also from the ground. In analysis it is then possible to separate these data and compute not only the maximal average reached height of the vegetation which will become the referential height h, but also to compute the three-dimensional image of the field.

A method is also possible where the average height of the stem of the crop is determined on the basis of the previous measuring of the surface of the field before the crop grows or at least before the state where crops cover the view of the ground itself, respectively. That means that the three-dimensional image of the field in state before the sowing is produced, or it is produced after such sprouting (germination) and growth where one can select from the image data gathered from above and thereby produce a three-dimensional image of the field on the ground level of the terrain. The referential height is subsequently computed as the average maximum of the height difference between the original three-dimensional field image and the later three-dimensional field image with the vegetation of crops.

In those points of the field where it is within a given margin of tolerance recognized that the upper cover of the crops does not reach the referential height h of the stem, one can determine that the crops are lodged. The larger is the difference the larger the angle of the crops' stems is. This relation can be expressed as $\beta=90-\sin^{-1}(x/h)$, where $\beta$ is an angle of deviation of the stem from the vertical position, x is vertical reached height of the stem on the field, h is actual height (biological height) of the stem. The goniometric function $\sin^{-1}$ can also be written as arcsin. Angle $\beta$ is zero if the crop is not lodged at all; it is 90° if the crop is completely lodged, that is, it is horizontally on the ground.

For each measured point of the field one can compute the angle (slope) of the crops which subsequently allows to produce a group of points for the individual chose intervals of angles. In order for the interpretation of the results to be intuitive, it is usually preferable if the intervals of the angles for the depiction of the states of the crops have at least 5 levels and subsequently a display with the borders of the individual areas for the respective groups of the angles is produced. A computer data procession also allows to compute a surface of the individual croups of lodging for the chosen intervals of lodging.

If the method is done in cornfield, or grain field, or wheat field, the stem will be a spike or a spikelet and the crop will be called grain or wheat.

In order to simplify the analysis of the above measured data, the method of analysis of three-dimensional images can include a step where the data from other sources are used. For example, a data which correspond to a position of a building in a field (such as a water tank, a rim around the mast, various devices, and so on) are excluded from the next analysis. Such objects can be excluded also by the mathematical analysis of the data when it is obvious that the inappropriate height does not correspond to the biological possibilities of the crop, but for the speed and efficiency of the processing it is preferable if the actual borders of the field with crops are identified in advance.

The other sources of data which help to produce a three-dimensional surface of the field or directly the ready-made model of the three-dimensional surface of the field can be preferably used as an entry data when using the method according to this invention. In multiple countries the agricultural surfaces are scanned and processed into a three-dimensional model due to various reasons, such as the assessment of funding. Such data can be used as an entry, whereby pursuant to their precision they are directly used or they are further precised by the own contactless measurement in the stage when the actual state of the upper cover of the crops is scanned. The source of the data for the creation of the three-dimensional surface of the field can be also spatial data from the ground vehicles which drive on the field, for example, a tractor which pulls sowing machine or a sprayer which sprays fertilizers or protective equipment. Such devices are usually already equipped by the positional system for the effective movement of the field and their data can be used to produce or precise the model of the three-dimensional surface of the field.

One can also work with presumption, when composing the three-dimensional model of the field, that within the set tolerance the surface of the field is continuous, without steps or irregularities which would not allow the agricultural machinery to move. Jump changes of the height of the upper cover of the crops which are within the range of the referential height h can be interpreted as lodged areas.

When producing the three-dimensional surface of the field a combination of the abovementioned data can be preferably used. For the method according to this invention it is basically unimportant how is the initial three-dimensional surface of the field, subsequently used as an entry for comparison with the actually measured three-dimensional surface of the upper cover of the crops, produced.

It is preferable if during the determining of the three-dimensional surface of the upper cover of the crops a digital mode (DSM2) of the surface of the crops is produced. The method of production of the digital vector map/digital model of the lodged cornfield areas for the customizable levels of lodging is characterized by the fact that:

a referential digital terrain model DTM1 is produced by air photography (air scanning) or by laser scanning of the surface of the geodetic locality before the sowing of the grain, or a referential digital terrain model DTM2 is produced by air photography or laser scanning of the surface of the geodetic locality after the damage event, or a corrected digital terrain model OFFSET DTM2 is computed, which stems from the referential digital terrain model DTM2 with the used parameter of depth m for the offset;

air photographing or laser scanning of the surface of the surfaces of the grain in the geodetic locality after the damage event is realized, which results in the digital model of the grain surface DSM2;

air photography or laser scanning of the surface of the surfaces of the grain in the geodetic locality measures the standard height of the grain spikes, or it is measured manually;

hardware computational devices produce a data matrix DSM of the surfaces of the grains by means of a photogrammetric method and the hardware computational devices produce a referential data terrain matrix DTM from the referential digital terrain model DTM1 or DTM2 or from the corrected referential digital terrain model OFFSET DTM2;

a classification of the grains to the classes depending on the angle α of the lodging of the grains in interval 0° to 90° is realized, whereby the result of this is the computation of the heights of the grains spikes pursuant to relation $x_{(0\ to\ n)} = h \cdot \sin \alpha_{(0\ to\ n)}$ for the creation of the digital vector map with the customizable levels of the lodging of the grains.

The digital model of the lodged cornfield areas is in the next step gathered from the above described method of creation of the vector map of the lodged cornfield areas for the customizable levels of lodging from the interval of classification classes $x_{(0\ to\ n)}$ in such a way that the matrix method realizes the difference between the data matrix of the grain spike surfaces DSM and referential data matrix of the terrain DTM.

The advantages of the method of production of the digital vector map/digital model of the lodged cornfield areas for the customizable levels of lodging of the grain according to this invention are obvious from the effects in which it manifests. In general, it can be stated that the originality of the proposed invention lies in the fact that this method concerns a classification and determination of the surfaces of the lodged cornfield areas by means of the air photography, using drones. In course of processing photogrammetric methods, geodetic measurements by means of GNSS apparatuses are used and the criteria of 2. class of the precision of geodetic measurement are met. The significant advantage of this method is the fact that it is possible to determine the particular level of lodging of cornfields—how much m² of cornfield was affected by lodging.

The computation of the surface of the lodged areas is preferably realized in such a way that after the computation of the slope of the crop for the individual points of the field groups are created for the variously chosen levels of lodging. These levels can be expressed in numbers pursuant to the ratio of the damage of the crop or they present angular levels of lodging within the chosen intervals. Subsequently points of the field are selected whose scope of lodging falls within the chosen group and these groups are then displayed in color which allows for the easily interpretable image of the state of the crops on the field. This approach allows to compute a surface on which there are points of individual groups pursuant to the ration of lodging. This results in the absolute values or percentual values, according to which a farmer or an insurance company or any other subject can assess the state of the crops on the field.

DESCRIPTION OF DRAWINGS

The invention is further disclosed by drawings 1 to 15. The depicted shapes of the field as well as dimensions and used scale are examples only and cannot be interpreted as limiting the scope of protection.

The method of production of digital vector map/digital model of the lodged cornfield areas for the customizable levels of lodging of the grain according to this invention is further disclosed on the drawings, where.

EXAMPLES OF REALIZATION

It is understood that the individual realizations according to this invention are presented for the purposes of illustration and not as limitations of these solutions. A person skilled in the art will find or will be able to find by no more than routine experimentation many equivalents to the specific realizations of the invention. These equivalents will fall within the scope of protection of the following patent claims. For the person skilled in the art it will present no problem to find an optimal adjustment and design of the system and choice of its elements; that is why these features are not addressed in detail.

Example 1

Figure 1:
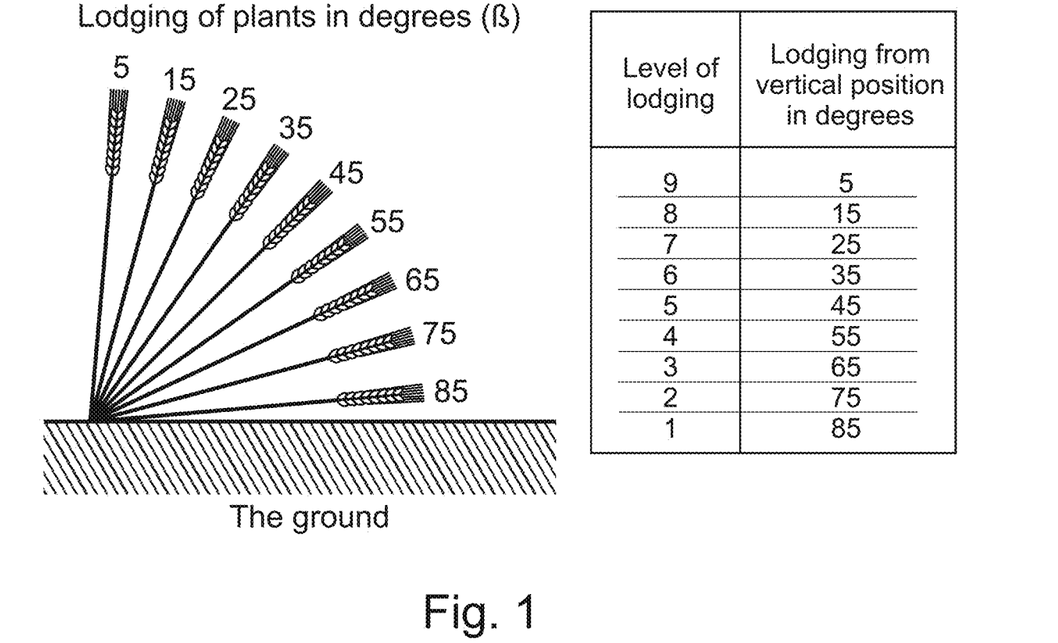
FIG. 1 schematically depicts the gradation of the lodging of the grain depending on the angle of slope of the spike or stem of the grain.
Figure 2:
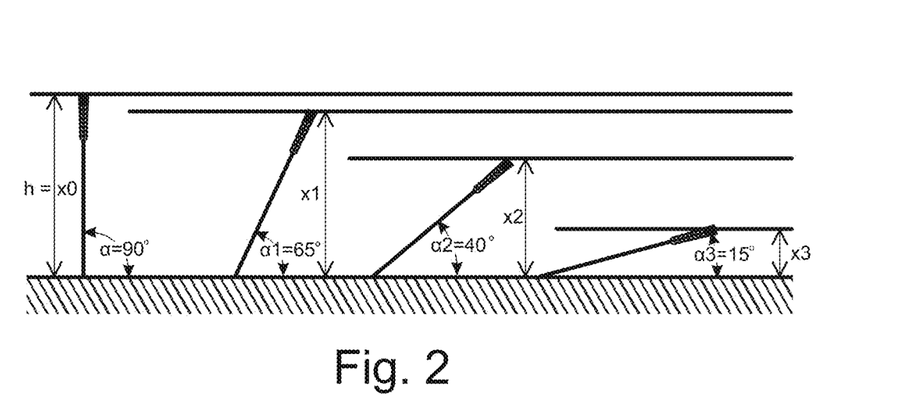
FIG. 2 schematically depicts the principle of computation of the digital model of the surfaces of the grain spikes DSM2 on the basis of the angle of slope of lodging.
Figure 3:
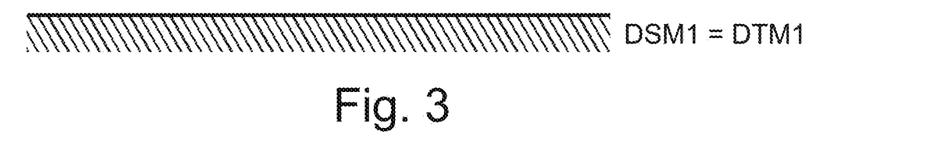
FIG. 3 schematically depicts the referential digital terrain model DTM1.
Figure 4:
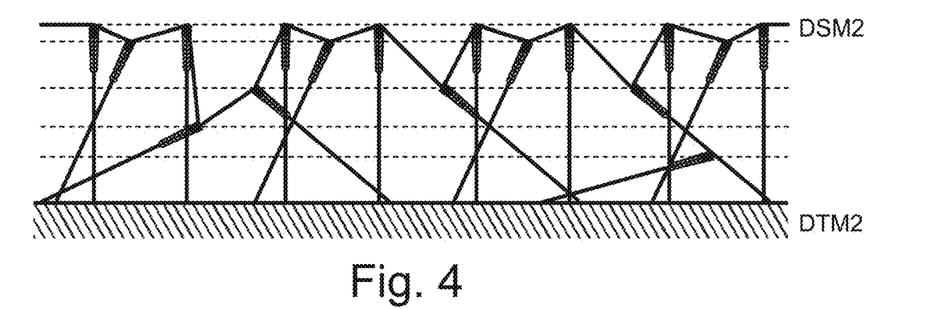
FIG. 4 schematically depicts the digital model of the surface of the grain spikes DSM2.
Figure 5:
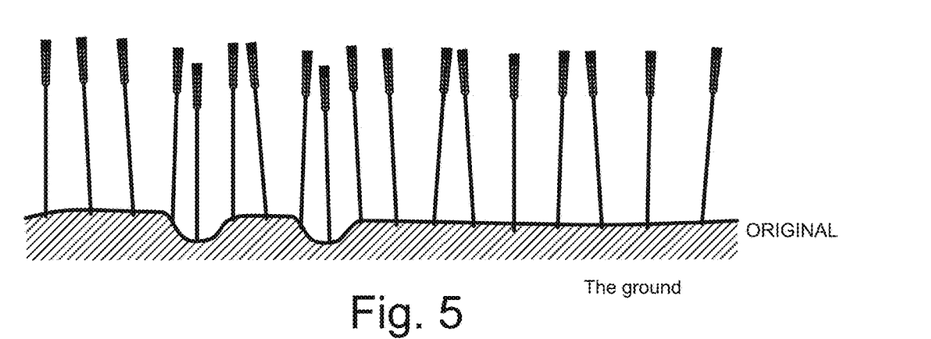
FIG. 5 depicts the actual terrain with the grown grain.
Figure 6:
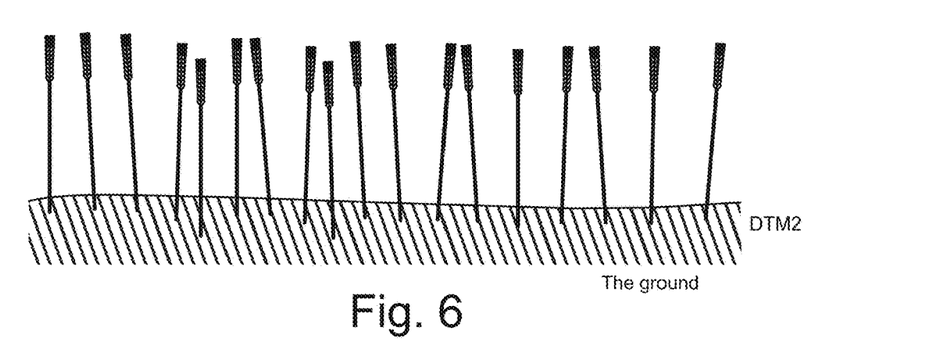
FIG. 6 is a digital terrain model DTM2 after the air photography with the grown grain.
Figure 7:
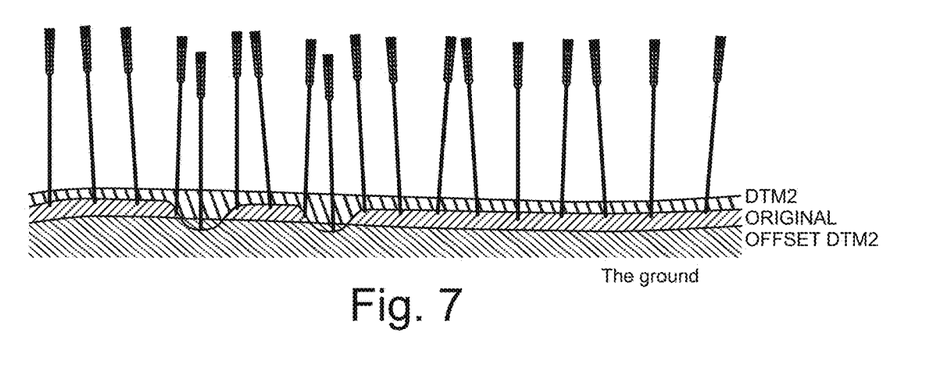
FIG. 7 depicts the overlapping of individual models of the terrain and application of the offset.
Figure 8:
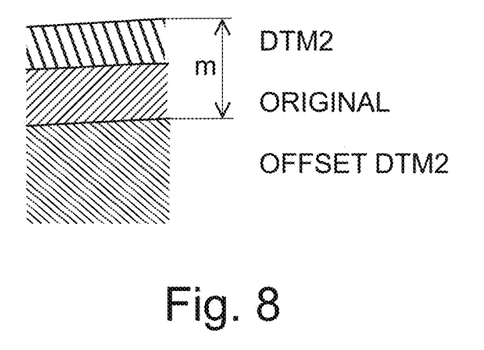
FIG. 8 depicts a corrected referential digital terrain model OFFSET DTM2 with m parameter.

In this example of particular realization of the invention a method of production of digital vector map/digital model of the lodged cornfield areas for the customizable levels of lodging as depicted on FIG. 4. The basis lies in the use of sinusoidal theorem $x = h \cdot \sin \alpha$, which is depicted on FIG. 2, where the height $h$ of the non-lodged grain is main parameter and angle $\alpha$ which depicts the slope of the grain against ground, whereby x0, x1, x2, x3, . . . xn is a height of the grain, where $n$ is a number of classes, which is depicted on FIG. 1. During the whole measurement we think about a single referential height $h$ of the non-lodged grain, which is determined on the basis of multiple measurements of the heights of the non-lodged grain. The number of classes of classification depends on the number of chosen angles α.

The method of production of the digital vector map of the lodged cornfield areas for the customizable levels of lodging consists of steps, where:

a referential digital terrain model DTM1 is produced by air photography (air scanning) or by laser scanning of the surface of the geodetic locality before the sowing of the grain, or a referential digital terrain model DTM2 is produced by air photography or laser scanning of the surface of the geodetic locality after the damage event or a corrected digital terrain model OFFSET DTM2 is computed, which stems from the referential digital terrain model DTM2 with the used parameter of depth m for the offset, as depicted on FIGS. 5 to 8;

air photographing or laser scanning of the surface of the surfaces of the grain in the geodetic locality after the damage event is realized, which results in the digital model of the grain surface DSM2;

air photography or laser scanning of the surface of the surfaces of the grain in the geodetic locality measures the standard height of the grain spikes, or it is measured manually;

hardware computational devices produce a data matrix DSM of the surfaces of the grains by means of a photogrammetric method and the hardware computational devices produce a referential data terrain matrix DTM from the referential digital terrain model DTM1 or DTM2 or from the corrected referential digital terrain model OFFSET DTM2;

a classification of the grains to the classes depending on the angle α in interval 0° to 90° is realized, whereby the result of this is the determination of the heights x of the grains pursuant to relation $x_{(0\ to\ n)} = h \cdot \sin \alpha_{(0\ to\ n)}$ for the creation of the digital vector map with the customizable levels of the lodging of the grains.

Example 2

Figure 9:
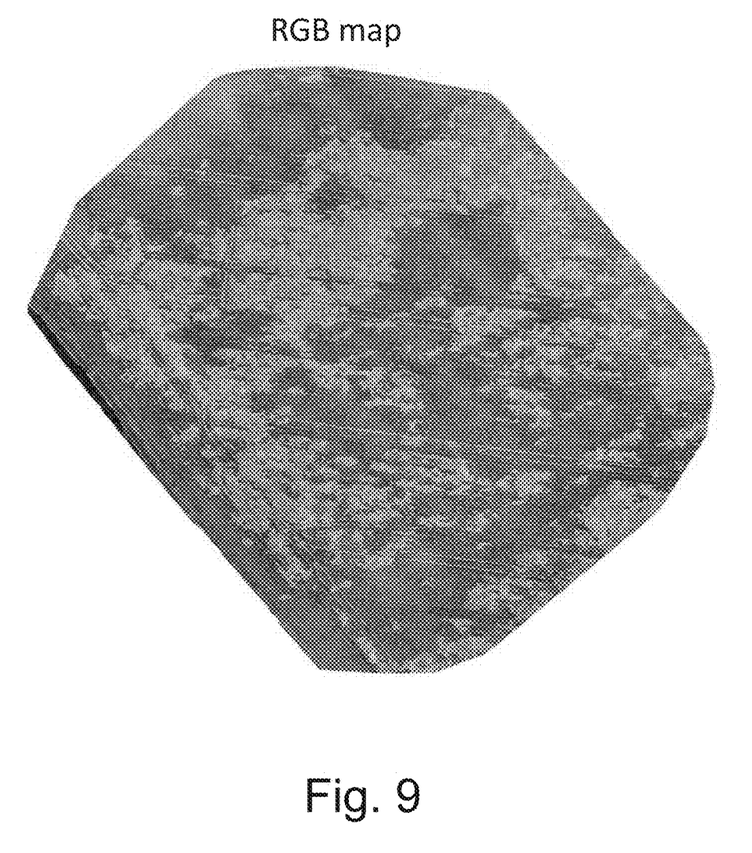
FIG. 9 depicts actual lodged cornfield with surface 24549 m².
Figure 10:
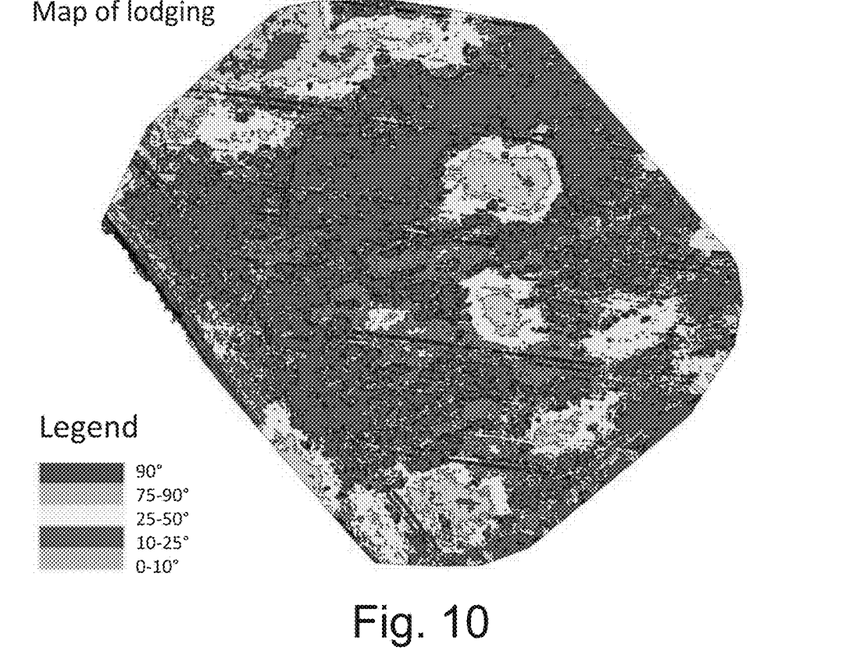
FIG. 10 depicts the classification of locality in five classes scaled according to the angle of slope of lodging of the grain.
Figure 11:
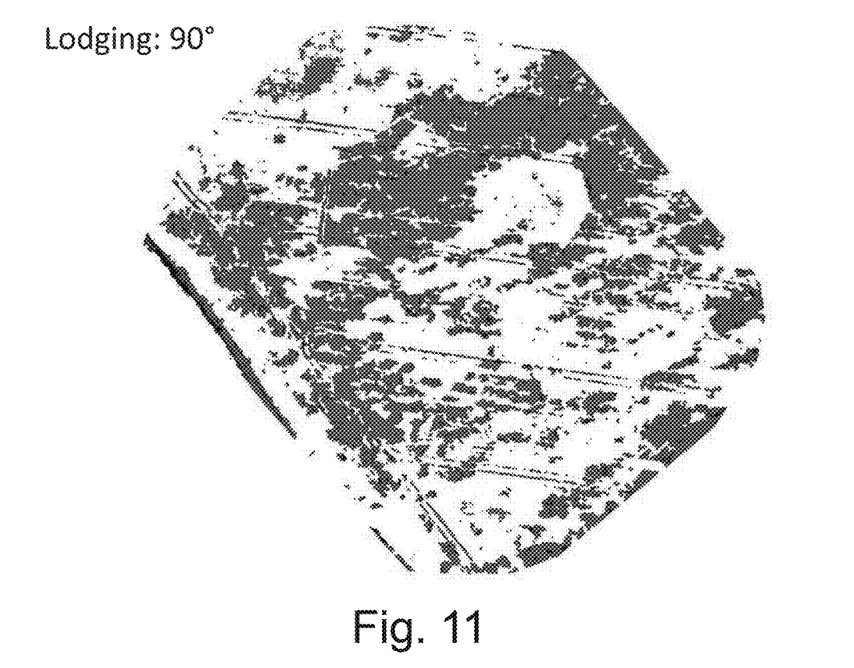
FIG. 11 depicts a locality of the lodged cornfield, where the angle of lodging of the cornfield 0° to 10° represents a lodging on the surface of 9035.03 m².
Figure 12:
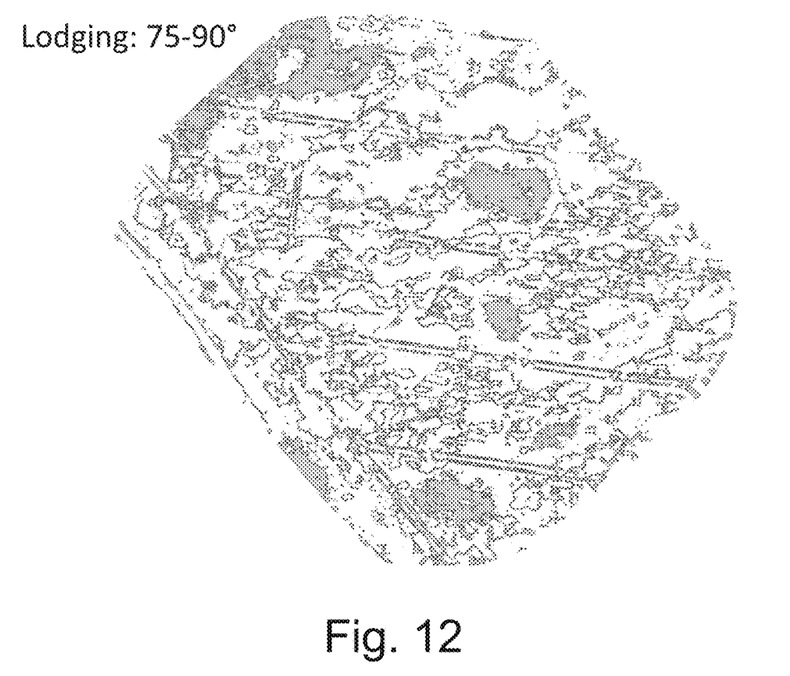
FIG. 12 depicts a locality of the lodged cornfield, where the angle of lodging of the cornfield 10° to 25° represents a lodging on the surface of 4324.39 m².
Figure 13:
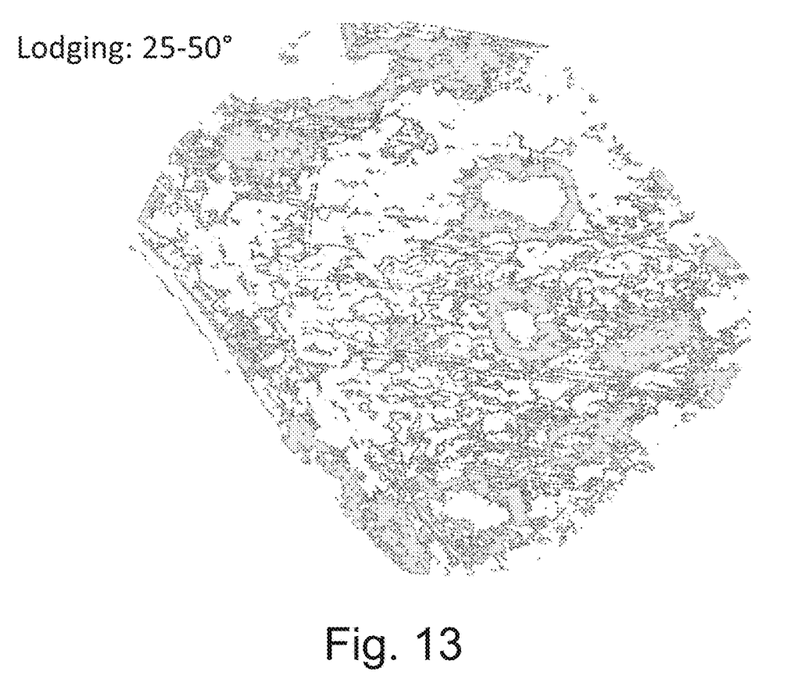
FIG. 13 depicts a locality of the lodged cornfield, where the angle of lodging of the cornfield 25° to 50° represents a lodging on the surface of 6442.24 m².
Figure 14:
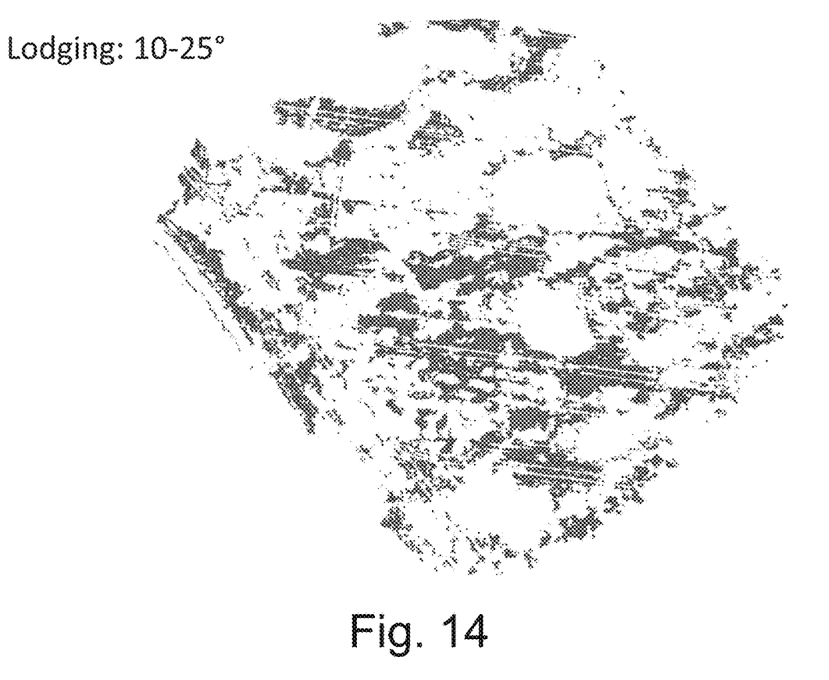
FIG. 14 depicts a locality of the lodged cornfield, where the angle of lodging of the cornfield 75° to 85° represents a lodging on the surface of 4034.43 m².
Figure 15:
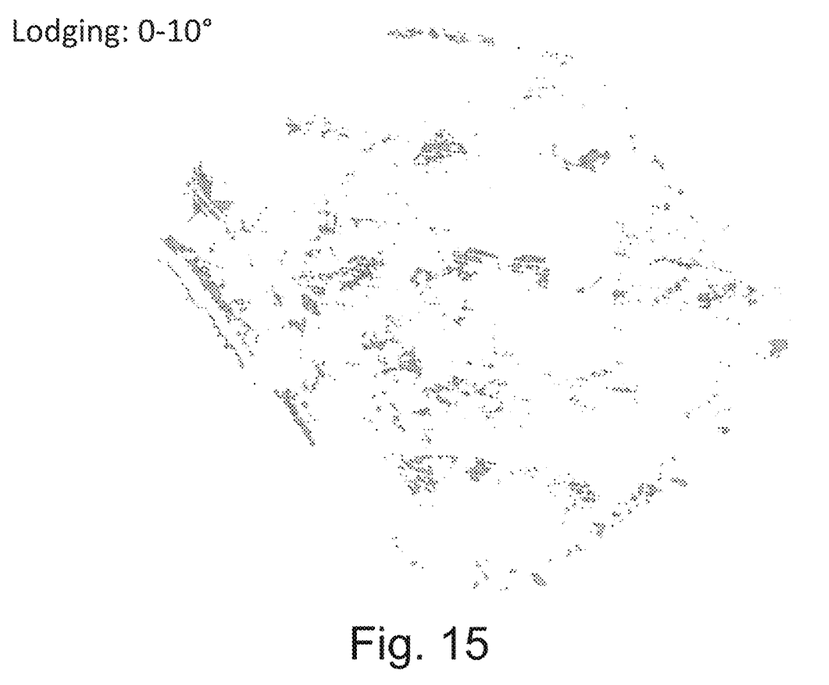
FIG. 15 depicts a locality of the lodged cornfield, where the angle of lodging of the cornfield 85° to 90° represents a lodging on the surface of 714.52 m².

In this example according to the particular realization a method of production of the digital model of the lodged cornfield areas for the customizable levels of the lodging of the grain is described, as disclosed on FIG. 10, which can be likened to the actual lodged cornfield depicted on FIG. 9. A difference between the data matrix of the surfaces of the grains DSM and referential data matrix of the terrain DTM is achieved by the matrix method; the result is a digital model of the lodged cornfield areas for the customizable levels of lodging of the grains from the interval of classification classes $x_{(0\ to\ n)}$.

Example 3

In this example a surface of the field without the grown vegetation is firstly optically or laser scanned from above by means of the flying device, for example UAV drone. At the beginning the data concerning the edges of the field are uploaded to the drone, whereby the cadastral maps in the digitalized form can be used as a basis. On the basis of the set edges of the field a fly path over the field is chosen in strips within which the surface of the soil is scanned. A three-dimensional image of the field is produced and stored for the further subsequent use.

After the vegetation grows, a whole upper cover of the vegetation can be scanned in various vegetation stages; in this example the upper cover is formed by upper parts of the grain spikes. On the basis of the gathered data a three-dimensional image of the vegetation is produced and this is compared with the earlier produced three-dimensional image of the field without vegetation. The height difference between these two images forms an actual height x of the vegetation in the individual points. A statistically weighted value of the maximum height difference between the three-dimensional image of the vegetation and the three-dimensional image of the field will be considered a referential height h. Subsequently, for all the points of the field within a chosen raster and with the set tolerance it is determined if the height x in a given point reaches the referential height h, and the difference is interpreted as the lodging of the crop where the angle of lodging $\beta = 90 - \sin^{-1}(x/h)$.

Pursuant to the computed angle of lodging the individual points are assigned to the classes of lodging 9 to 1, which corresponds to the angles β=5 to 85% with a 10-step interval. The points on the groundplan of the field are depicted in various colors pursuant to the assignment to the individual groups 9 to 1. It is also computed which surface is taken by the points assigned to individual groups, which provides a mathematical overview of the state and damage of the crops on the fields.

Example 4

Referential height h of the stem in this example is set in such a way that the length of the stem has been measured manually in 20 randomly chosen plants and such measured mean height has been set as a referential height h. Lidar is used in order to produce a three-dimensional image of the field (DTM) according to this example.

Example 5

In this example the three-dimensional image of the upper cover of the crops is scanned from above by means of a flying device with a laser scanner. The goal is to determine the actual state of the crops after the effects of the wind, which can be considered a damage event (cas fortuit) pursuant to the subsequently recognized damage rate and particular insurance conditions. The crop in this example is ripe grain before harvest.

The laser scanner scans the surface of the upper cover of the grain, whereby the laser beam is at the same time reflected from the ground, that is, from the surface of the field in places where the laser beam penetrates between the grain spikes. Raw data thus contain the description of the upper cover of the crops as well as irregular points conforming to the three-dimensional surface of the field. The data disclosing the surface of the field can be selected away from the data by means of mathematical analysis and subsequently they are used in this example together with the data from the official database (for example Geodetic and Cartographic Institute or other such state institute in a given country) for the give field. After the data from the official database are precised by means of the measured data from the goal-directed flight of the laser scanner above the given field, a three-dimensional surface of the field is produced.

The referential height h of the stem of the crop in this example has been computed by means of assessment of the maximal difference between the surface of the upper cover of the crops and the position of the ground measured next to them in points where the laser scanner scanned the position of the ground, that is, the surface of the soil. Such assessment is realized for multiple points and the referential height h is computed by means of averaging. The method can be set in such a way that the flying device flies closer to the surface of the crops in chosen points in such a way that it can realize measurements for the referential height h, that is, it approaches the surface of the upper cover in such a way that it can reliably measure the height position of the ground in the gaps between the spikes.

The reached height x of the vegetation, that is, the height to which the crop reaches, is computed for the individual points by means of the comparison of the three-dimensional surface of the upper cover of the crops with the three-dimensional surface of the field. The angle of lodging β is computed by means of the goniometric function β=90−arcsin (x/h).

The method pursuant to this invention has an advantage, among others, in that during the operation of flying above the field all necessary data for the assessment of the state of the crops are gathered, without the need for the previous scanning of the field before sowing, or without the need for manual measurement of the heights of the spikes, whereby the referential height h would have been computed on the basis of such measurement.

INDUSTRIAL APPLICABILITY

The industrial applicability is obvious. Pursuant to the proposed invention it is possible to repeatedly identify and display lodged crop areas of a field. The method of production of digital vector map/digital model of the lodged cornfield areas for the customizable levels of lodging pursuant to this invention is a technology applicable in geodesy (geodetics) or agriculture.

LIST OF ACRONYMS

DTM—Digital Terrain Model
DSM—Digital Surface Model
UAV—unmanned aerial vehicle
Lidar—Light Detection and Ranging

The invention claimed is:

1. A method of identification and display of areas of a lodged crops field, the method comprising the steps of:
   recognizing a three-dimensional surface of an upper cover of the crops;
   recording by using a contactless scanning of the field from above;
   determining a referential height h of the crop's stem;
   determining a three-dimensional surface of the field from which the crops grow;
   computing a reached height x of a vegetation for individual points of the field by a comparison of the three-dimensional surface of the upper cover of the crops with the three-dimensional surface of the field,
   wherein in a case the reached height x of the vegetation is smaller than the referential height h of the crop's stem this difference between the reached height x of the vegetation and the referential height h of the stem determines in the give point of the field an angle β of lodging pursuant to goniometric function.

2. The method of identification and display of the areas of the lodged crops field according to claim 1, wherein the slope of deviation of the stem from a vertical position is computed as β=90−sin$^{-1}$ (x/h).

3. The method of identification and display of the areas of the lodged crops field according to claim 1, wherein the referential height h of the crop's stem is determined as a mean of multiple manual measurements of the stem's length, preferably the mean from at least 5 measurements, especially preferably the mean from at least 15 measurements.

4. The method of identification and display of the areas of the lodged crops field according to the claim 1, wherein the referential height h of the crop's stem is determined by the measurement of a height of a step between the three-dimensional surface of the upper cover of the crops and the three-dimensional surface of the field at an edge of the field.

5. The method of identification and display of the areas of the lodged crops field according to claim 1, wherein the referential height h of the crop's stem is determined by means of an altitude scanning of the surface of the field from above in places where this is visible from an above view between the stems of the crop and by means of the scanning of the upper cover of the crops in an adjacent place of the field, preferably the maximal differences between the measured heights are sought in this process.

6. The method of identification and display of the areas of the lodged crops field according to claim 3, wherein a tolerance when comparing the reached height x of the vegetation with the referential height h of the crop's stem is identical or higher than a measurement error of the referential height h or a computational error of the referential height h.

7. The method of identification and display of the areas of the lodged crops field according to claim 1, wherein the three-dimensional surface of the field is scanned and its model is produced before a sprouting of the crops and this model is stored for purposes of later comparison with the three-dimensional model of the upper cover.

8. The method of identification and display of the areas of the lodged crops field according to claim 1, wherein groups of the points of the field of the crops for chosen intervals of the angles pursuant to the computed slope of the stem in the given point are created, whereby the intervals of the angles have a range at least 5 degrees, and subsequently a display for the respective groups of the angles is created.

9. The method of identification and display of the areas of the lodged crops field according to claim 1, wherein groups of the points of the field of the crops for chosen intervals of the angles pursuant to the computed slope of the stem in the given point are created, whereby the intervals of the angles have a range at least 5 degrees, and subsequently a surface for the respective groups of the angles is computed.

10. The method of identification and display of the areas of the lodged crops field according to claim 1, wherein:
   a referential digital terrain model (DTM1) is produced by an air scanning of the surface of a geodetic locality before sowing of a grain, or a referential digital terrain model (DTM2) is produced by the air scanning or a laser scanning of the surface of the geodetic locality in an actual state or a corrected digital terrain model (OFFSET DTM2) which stems from the referential digital terrain model (DTM2) with a used parameter (m) of a depth of an offset is computed;
   the air scanning or the laser scanning of an area of the surfaces of the grain in the geodetic locality in the actual state is realized, which results in a digital model of the grains surface (DSM2);
   the air scanning or the laser scanning of the area of the surfaces of the grain in the geodetic locality is used to measure the standard height of grain spikes or the standard height of the grain spikes is measured manually;
   hardware computational devices produce a data matrix (DSM) of the surfaces of the grains by means of a photogrammetric method and the hardware computational devices produce a referential data terrain matrix (DTM) from the referential digital terrain model (DTM1) or (DTM2) or from the corrected referential digital terrain model (OFFSET DTM2);
   a classification of the grains into classes depending on an angle α of a slope of the lodged grains in an interval 0° to 90° is realized, whereby a result of this is a computation of the heights h of the grain spikes pursuant to relation $x_{(0\ to\ n)} = h \cdot \sin \alpha_{(0\ to\ n)}$ for purposes of a creation of a digital vector map with customizable levels of lodging of the grains.

11. The method of identification and display of the areas of the lodged crops field according to claim 10, wherein a difference between the data matrix (DSM) of the surfaces of the grains and the referential data terrain matrix (DTM) is realized by a matrix method, whereby the result of this is a digital model of the areas of the lodged grains field for the levels of the lodging of the grains customizable from the interval of the classification classes $x_{(0\ to\ n)}$.

12. The method of identification and display of the areas of the lodged crops field according to claim 1, wherein wherein the three-dimensional upper cover of the crops is scanned and recorded by an unmanned aerial vehicle.

13. The method of identification and display of the areas of the lodged crops field according to claim 10, wherein the surface of the field and/or the surface of the upper cover of the crops is scanned photogrammetrically and/or by means of the laser scanning and/or by means of a lidar.

14. The method of identification and display of the areas of the lodged crops field according to claim 13, wherein the surfaces on which, according to geodetic information, there are objects making it impossible for the crops to grow, are excluded from the data scanned from above.

\* \* \* \* \*